Patented Feb. 3, 1953

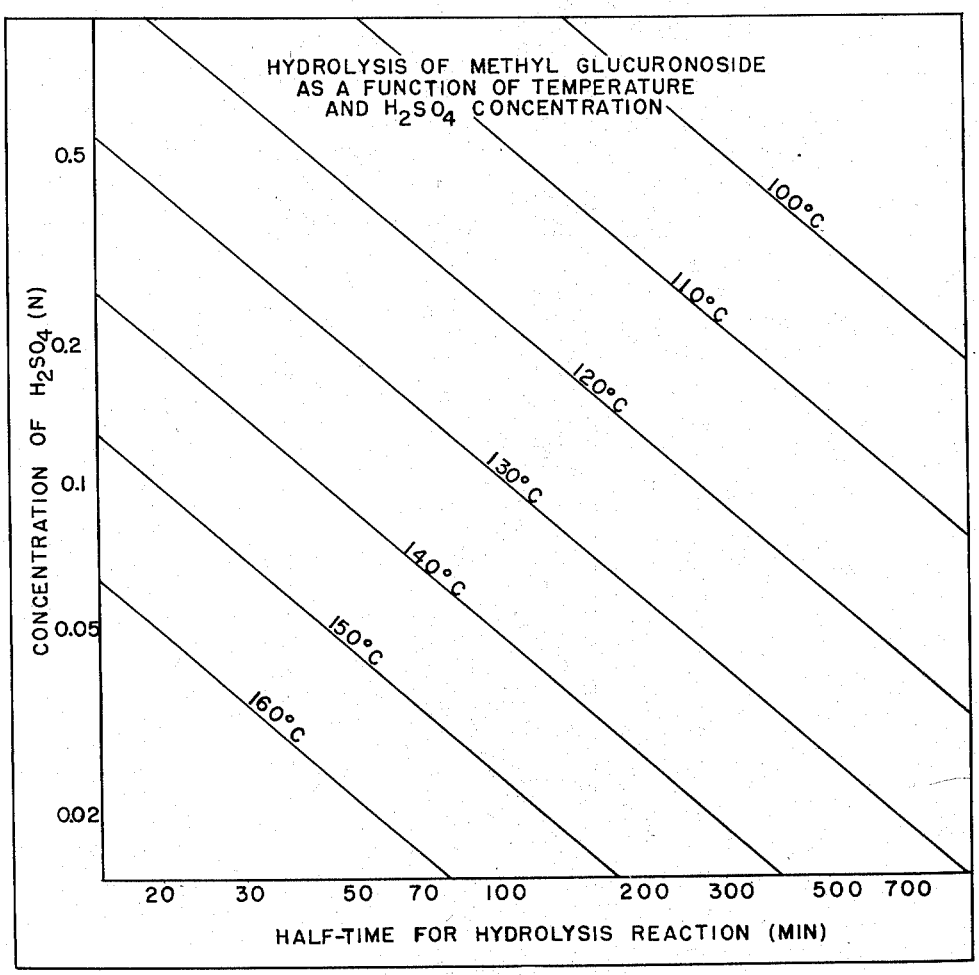

2,627,520

UNITED STATES PATENT OFFICE 2,627,520

PROCESS FOR THE RECOVERY OF GLUCURONOLACTONE

Donald G. Benjamin, Maywood, and Spiro W. Kapranos, Clarendon Hills, Ill., assignors to Corn Products Refining Company, New York, N. Y., a corporation of New Jersey Application October 17, 1950, Serial No. 190,662

28 Claims. (Cl. 260—344)

This invention relates to the recovery of glucuronic acid as pure glucuronolactone from mixtures obtained by oxidizing suitable glucose derivatives.

The best methods available for making glucuronic acid involve oxidizing a glucose derivative wherein the aldehyde group is protected against oxidation, to the corresponding glucuronic acid derivative, and thereafter hydrolyzing the glucuronic acid derivative to remove the protecting group to yield glucuronic acid.

Simple glucosides, such as methyl glucosides, represent the most economically prepared pure glucose derivatives which are suitable for oxidation to the corresponding glucuronic acid derivatives. Such compounds are particularly suitable since they are relatively resistant to hydrolysis under either acidic or alkaline conditions, and therefore can be oxidized without hydrolysis in systems where less stable glucose derivatives would undergo hydrolysis and thus expose the aldehyde group to undesired oxidation.

Several improved methods (which will be described hereinafter) of oxidizing glucose derivatives, for example, glycosides, to the corresponding glucuronic acid derivatives form the subject matter of co-pending applications, U. S. Serial Nos. 111,340, filed August 8, 1949; and 133,690 (U. S. Patent No. 2,592,249) and 133,691, both filed December 17, 1949. Although high yields of glucuronic acid derivatives are produced by the methods described in the aforementioned applications, these yields seldom exceed about 70 per cent of theory. Thus, regardless of the method employed, mixtures are obtained which usually contain some of the unchanged glucose derivative along with various acidic and neutral products of the oxidative degradation of the original glucose derivatives in addition to the desired glucuronic acid derivative. The nature and proportions of the non-uronic acid impurities present depend upon the starting material used and the method of oxidation. None of the components of such mixtures, and particularly the desired glucuronic acid derivative, differs sufficiently in solubility to allow its efficient separation by concentration and crystallization. The formation of derivatives or salts, which might differ in solubility sufficiently to allow separation, has offered little advantage as a refining method.

A certain amount of purification can be effected at this stage, however. For example, neutral components of the mixture, such as unoxidized methyl glucoside, and inorganic impurities can be removed by suitable treatment with ion exchange resins, thus obtaining a mixture containing only organic acids, including the glucuronic acid derivative. Or, the acidic components may be esterified with an alcohol, such as propyl, butyl or amyl, and the esterified mixture extracted with water to remove water soluble impurities, leaving a mixture of esters (including that of the glucuronic acid derivative) which may be hydrolyzed to recover the glucuronic acid. This latter method forms the subject matter of co-pending application U. S. Serial No. 143,827, filed February 11, 1950.

The processes aforementioned have been found useful as preliminary refining procedures but, in either case, the desired glucuronic acid derivative still is accompanied by a complex mixture of acids, including oxalic acid, and, probably, tartronic, tartaric and various ketonic acids. Besides, the group used to protect the aldehyde group during oxidation still must be removed from the glucuronic acid derivative in order to obtain glucuronic acid. This requires hydrolysis in the presence of a mineral acid catalyst. While glucosides, such as methyl glucoside, are particularly suitable for oxidation to glucuronic acid derivatives (as already stated) because of their resistance to hydrolysis, this stability holds through to the glucuronic acid derivative. Glucuronic acid itself is de-carboxylated readily when heated in the presence of substantial concentrations of mineral acid. Therefore, since hydrolysis of glucuronic acid derivatives, such as methyl glucuronoside, requires relatively prolonged treatment in the presence of a mineral acid catalyst at relatively high temperature, any treatment which is sufficiently drastic to effect essentially complete liberation of glucuronic acid from methyl glucuronoside, for example, is likely to result in excessive destruction of the glucuronic acid.

Even if hydrolysis is effected with little destruction of glucuronic acid, separating the glucuronic acid requires concentrating the hydrolyzate to a small volume and crystallization of the highly soluble compound from a mixture of products of similar high solubility, as will be discussed hereinafter. If the mineral acid catalyst is neutralized, some of the glucuronic acid may be destroyed thereby, since glucuronic acid is sensitive to contact with alkali. More important, the necessity of removing the inorganic salt formed by neutralization imposes an additional step on the process and is difficult to accomplish without mechanical loss of product. In addition, it is difficult to avoid neutralization of some of the glucuronic acid, thus forming a salt which is more soluble and more difficult to isolate than the acid itself. On the other hand, if the inorganic acid catalyst is not removed, concentration of the hydrolyzate to a sufficiently small volume to initiate crystallization of the desired product may result in a sufficiently high concentration of mineral acid to destroy the desired product, particularly unless water removal is effected at a very low temperature.

As aforementioned, separation of glucuronic acid from the hydrolyzate involves separating glucuronic acid from a mixture of products which are all highly soluble. Glucuronic acid is not necessarily the least soluble of the compounds in the hydrolyzate and may fail to crystallize, or it may crystallize along with a major portion of the impurities which have similar solubilities.

Even if the desired compound does crystallize in a relatively pure form from the concentrated hydrolyzate, the product usually contains too much color to be suitable for most uses and must be recrystallized. When glucuronic acid is dissolved in water it tends to equilibrate with its lactone at a rate that is influenced by temperature and presence or absence of mineral acid. Similarly, the lactone tends to form an equilibrium mixture of glucuronic acid and glucuronolactone when dissolved in water. These two forms have different solubilities, the lactone being less soluble under most conditions. Therefore, if either glucuronic acid or glucuronolactone is dissolved in hot water, treated with carbon and filtered in the manner usually employed to purify crude products, concentration of the resulting filtrate may yield a small first crop that consists of relatively pure glucuronolactone, but succeeding crops contain constantly increasing amounts of free glucuronic acid, so that no uniform product is obtained in good yield. A further complicating factor is that crops representing mixtures of free acid and lactone usually consist of very fine crystals and are difficult to separate from adhering mother liquor, with the result that the final product is likely to be contaminated with miscellaneous non-uronic acid products.

Considering all of these difficulties, it is obvious that specialized techniques are required in an efficient and economical procedure for obtaining pure glucuronic acid or glucuronolactone from mixtures produced by oxidizing suitable glucose derivatives.

An object of the present invention is to provide a new and improved method, which is simple and efficient, for recovering glucuronic acid as pure glucuronolactone from mixtures produced by oxidizing glucose derivatives. Another object is to provide a method of recovering pure glucuronolactone from mixtures resulting from the oxidation of glucosides. Another object is to provide a method for recrystallization of crude glucuronolactone whereby markedly higher yields are obtained than heretofore were possible. Other objects will appear hereinafter.

Our invention is based on a particular sequence of steps of treating mixtures containing glucuronic acid derivatives, some of which are carried out under critical conditions. In general, our invention comprises treating mixtures resulting from the oxidation of glucose derivatives which yield derivatives of glucuronic acid, first with ion exchange resins to separate the acidic components consisting of a mixture of organic acids, including the glucuronic acid derivative, from the rest of the components. This treatment results in a dilute aqueous solution of the acid components. This solution is then concentrated preferably to about 30 to about 40 per cent dry substance, but not exceeding about 50 per cent, and hydrolyzed under controlled conditions with a mineral acid catalyst until hydrolysis of the glucuronic acid derivative is not more than about 85 per cent complete. The next step involves concentrating the hydrolyzate, without removing the mineral acid catalyst, under controlled conditions to a point suitable for crystallization and allowing crystallization to take place. Optionally, the mother liquor may be rehydrolyzed separately but preferably is returned to the system and subjected to the hydrolysis and concentration steps.

The crystals so obtained will be pure enough for some purposes but if further purification, particularly, color removal, is desired, another step may be incorporated in the process. This step comprises dissolving the crude crystalline product as rapidly as possible in water to form a saturated solution at a temperature within the range of 20° C. to 60° C. but preferably not exceeding 40° C., and treating the solution with decolorization carbon, the temperature being within the range of 20° C. to 60° C. but preferably not exceeding 40° C., removing the carbon and evaporating the solution rapidly under the highest possible vacuum at a temperature within the above range but preferably not exceeding 40° C. until as large a crop of crystals as can be conveniently separated has formed. The crystals thus obtained will be pure glucuronolactone. Optionally, the mother liquor may be concentrated and further crops of glucuronolactone recovered separately, but preferably it is added to a new solution of crude crystalline material.

In order to simplify the description, the procedure will be described as applied to the products obtained by oxidation of methyl glucoside, in accordance with the methods described in the aforementioned co-pending applications, Serial Nos. 111,340; 133,690 (U. S. Patent No. 2,592,249), and 133,691, although it is to be understod that products resulting from the oxidation of methyl glucoside by other methods or the oxidation of other glucose derivatives of the glycoside type by the same or different methods are also suitable for purposes of the present invention. Before proceeding with the description of the invention, the processes above mentioned for oxidizing glucose derivatives will be outlined. Serial No. 111,340 relates to a process for the catalytic oxidation of glucose derivatives. A glucose derivative having the aldehyde group protected, e. g., a glucoside, in water solution is oxidized with an oxygen containing gas in the presence of a platinum or palladium catalyst. The pH of the solution is maintained by means of a buffer solution, e. g., sodium carbonate, within the range of 4 to 11 and the temperature within the range of 40° C. to 120° C. during the oxidation. The oxidation is carried on until a substantial proportion of the glucoside is oxidized.

U. S. Patent No. 2,592,249 relates to a process of oxidizing glucose derivatives having the aldehyde group protected, by dissolving the glucose derivative in sufficient liquid nitrogen dioxide to attain a homogeneous system, and allowing oxidation to proceed for a sufficient time to oxidize a substantial proportion of the primary alcohol groups of the glucose derivative.

Serial No. 133,691 relates to a process of oxidizing a glycoside with nitric acid in the presence of a catalyst from the group consisting of nitrous acid, salts of nitrous acid, and nitrogen dioxide gas at a temperature within the range of 20° C. to 100° C. for a sufficient time to oxidize a substantial proportion of the primary alcohol groups of the glycoside. The concentration of the nitric acid used should be within the range of 65 per cent to 100 per cent.

The first step in the present invention involves the separation of the acidic components, including the glucuronoside from the rest of the components. Regardless of the method used to oxidize methyl glucoside to produce glucuronic acid, the oxidation product usually contains some neutral components, primarily unoxidized methyl glucoside, and these can be separated from acidic components advantageously by suitable treatment with many of the commercially available cation and anion exchange resins. The order of application of the ion exchange treatment depends upon the method which has been used for oxidation of the methyl glucoside.

If oxidation was carried out in an acidic system with no inorganic cations added, the aqueous solution of the oxidation mixture is adjusted to about 10 per cent to about 15 per cent solids content and passed over an anion exchange resin in the hydroxyl state which adsorbs the anions in the mixture. The resin then is washed and eluted with a suitable base, such as sodium hydroxide solution. The eluate, which contains the salts of the acids formed during oxidation, is treated with a cation exchange resin to produce a solution containing a mixture of the free acids, from which pure glucuronolactone can be recovered by carrying out the various additional operations of this invention.

If oxidation was carried out in an alkaline system or in a buffered system containing inorganic cations, these cations preferably are removed as by treatment with a cation exchange resin before the acidic components of the mixture are separated by adsorption on the anion exchange resin. After the acidic components have been adsorbed on the anion exchange resin, subsequent operations to obtain the mixture of acids produced in the oxidation step are the same as above described.

If oxidation has been prolonged to the point where substantially all of the methyl glucoside has been oxidized to acidic substances, ion exchange treatment of the product may be dispensed with. However, even in this case, it is sometimes advantageous to treat the mixture with sufficient anion exchange resin to remove the major portion of certain contaminating acids, such as oxalic acid, which are more strongly adsorbed than the glucuronic acid derivative.

Any of these methods of treatment results in a mixture of organic acids in which the glucuronic acid derivative (methyl glucuronoside) usually constitutes from about 40 to about 80 per cent of the dry substance, depending upon the method and efficiency of the oxidation step.

While it would appear logical that more efficient refining might result from the ion exchange treatment if this were postponed until hydrolysis of the glucuronic acid derivative had been accomplished, we have found that such a sequence of operations is disadvantageous for several reasons. Once hydrolysis has been effected and free glucuronic acid has been produced, some of this compound is likely to be destroyed by contact with the alkaline solution used to elute the acids from the anion adsorbing resin. Likewise, conditions necessary to effect hydrolysis favor establishment of equilibrium between glucuronic acid and its lactone. The lactone ring of the latter compound is not hydrolyzed readily by contact with anion exchange resins and, consequently, glucuronic acid in this form is not readily adsorbed. Therefore, a substantial portion of the glucuronic acid may be lost to or discarded with the neutral impurities if ion exchange treatment is postponed until after the hydrolysis step. An additional disadvantage is that any methyl glucoside that escapes oxidation will be hydrolyzed and will not be available for recycling to the oxidation step. A still further disadvantage in hydrolyzing the mixture before ion exchange refining is that resin requirements are increased by the presence of the mineral acid catalyst used for hydrolysis unless this is removed and, for reasons which will be explained later, there appears to be a distinct advantage if concentration of the hydrolyzate to induce crystallization is effected in the presence of a mineral acid catalyst.

The solution resulting from the ion exchange treatment, as above described, and containing methyl glucuronoside is concentrated to about 30 per cent to about 40 per cent dry substance, but not exceeding about 50 per cent. Concentration prior to hydrolysis is advantageous for several reasons. Methyl glucuronoside is a relatively stable compound and its solutions can be concentrated even at high temperatures without destruction, whereas glucuronic acid undergoes decomposition if its solutions are concentrated at high temperatures and is subject to destruction at low temperatures in the presence of substantial concentrations of mineral acids. Therefore, if process liquors are concentrated to the greatest possible extent before hydrolysis, the hydrolyzate will require a shorter concentration period to induce crystallization of the product and there is less danger of destroying the glucuronic acid during this final concentration operation. Furthermore, from an operating standpoint, it is advantageous to concentrate the liquor as far as possible before adding the mineral acid since the initial concentration can be carried out in ordinary apparatus without major corrosive effects. Therefore, the volume capacity of corrosion resistant apparatus required for the hydrolysis and final concentration of the hydrolyzate is minimal. In addition, it has been found that the unhydrolyzed liquor has less tendency to foam than the hydrolyzate so that concentration can be effected more rapidly and with fewer complications prior to hydrolysis than after. Furthermore, it is advantageous to carry out the hydrolysis step on highly concentrated solution for reasons which will be discussed more fully hereinafter.

After the solution obtained from the ion exchange treatment has been concentrated to about 30 to about 40 per cent dry substance, there is added to the solution a mineral acid, such as hydrochloric or sulfuric. In the case of sulfuric acid, which is the preferred catalyst, an amount sufficient to make the solution preferably about 0.3 to 0.7 normal should be used. Since hydrochloric acid is a stronger acid, correspondingly smaller quantities should be added if this catalyst is employed. The range for hydrochloric acid is about 0.1 to 0.5 normal. The acidified solution is then heated preferably within a temperature range of 100° C. to 500° C. until hydrolysis of the methyl glucuronoside is about 60 per cent to about 85 per cent complete. It is advantageous to conduct the hydrolysis in the presence of 1 per cent to 5 per cent, dry basis, of decolorizing carbon although carbon treatment may be omitted entirely or carried out as a separate step after hydrolysis.

It has been found that hydrolysis of methyl glucuronoside and destruction of glucuronic acid under the conditions used to effect hydrolysis are essentially first order reactions. Since methyl glucuronoside is relatively stable to destruction, while glucuronic acid is relatively unstable under the hydrolysis conditions employed, as hydrolysis continues and the ratio of free glucuronic acid to methyl glucuronoside becomes greater, rate of destruction of free glucuronic acid approaches rate of hydrolysis of methyl glucuronoside. We have discovered that increasing concentrations of mineral acid, within the range of 0.3 to 2.0 normal increase the hydrolysis rate over the destruction rate. However, when concentrations in the higher portion of the range are used, it is difficult to evaporate the resulting hydrolyzate to the required final concentration without destroying the product. For practical operating conditions in subsequent steps the maximum mineral acid concentration for the hydrolysis is about 0.7 normal when sulfuric acid is used as catalyst.

We have also found that excessive destruction of glucuronic acid is avoided by stopping the hydrolysis reaction at not more than 85 per cent completion, or preferably at about 75 per cent completion if mother liquors from crystallization are to be recycled. In addition, we have observed that an increase in temperature increases the rate of the hydrolysis reaction more than that of the destruction reaction at least up to 130° C.

Time, temperature and concentration of mineral acid are interdependent variables in the hydrolysis reaction. Therefore, various combinations may be employed. If the concentration of sulfuric acid is 0.7 normal, the time should not exceed 25 minutes if the temperature is of the order of 130° C. If the temperature is lower, e. g., of the order of 110° C., then the time may be longer but should not exceed 160 minutes where the concentration is 0.7 normal. When the solution has been acidified with sulfuric acid and is 0.5 normal with respect to this acid and the hydrolysis is carried out under pressure at about 130° C., the desired degree of hydrolysis is attained in about 27 minutes. The preferred range of temperature for 0.5 to 0.7 normal sulfuric acid concentration is 120° C. to 140° C. although the temperature range may be 100° C. to 200° C. Figure 1 shows the relation of time, temperature, and concentration of sulfuric acid. Since there are so many combinations of time, temperature, and concentration of acid possible, it would not be feasible to set forth all of them here. However, it is believed that with the data already given, together with those which will appear in the examples, those skilled in the art will have no difficulty in carrying out this phase of the invention.

Another reason why it is advantageous to hydrolyze methyl glucuronoside solutions at high D. S. concentrations is that rate of hydrolysis of methyl glucuronoside at a given temperature and concentration of mineral acid is relatively independent of the concentration of methyl glucuronoside at least up to 40 per cent concentration. Thus, one liter of a solution containing 400 g. of methyl glucuronoside and one liter of a solution containing 100 g. of methyl glucuronoside require substantially the same amount of sulfuric acid to effect 75 per cent hydrolysis of the methyl glucuronoside under fixed conditions of time and temperature. Hydrolysis at high solids content therefore allows more efficient use of the mineral acid catalyst. Another advantage gained by hydrolyzing at high solids content is that hydrolyzates produced in this manner do not attain such high concentrations of mineral acid during the final concentration step and consequently the conditions which prevail during this operation are less likely to be destructive to the glucuronic acid. In the illustration just given, hydrolyzate from the 10 per cent methyl glucuronoside solution when concentrated to 80 per cent to 85 per cent dry substance (which is about the concentration required for the glucuronic acid in such solutions to crystallize as glucuronolactone) would contain approximately four times as much sulfuric acid as would hydrolyzate from the 40 per cent solution when concentrated to the same solids content.

When hydrolysis of methyl glucuronoside is carried out, it has been found advantageous to remove the aglycone compound (methanol) liberated. Otherwise it accumulates, and when a substantial amount is present, tends to reverse hydrolysis. This effect becomes increasingly significant at high solids content. Continuous removal of methanol during hydrolysis, as by steam distillation, shortens the time required to effect any given degree of hydrolysis and thereby helps to minimize destruction of glucuronic acid.

After hydrolysis, as above described, is completed, the hydrolyzate, without removal of the mineral acid catalyst, is cooled to about 35° C., filtered and evaporated under vacuum at a temperature within the range of 30° C. to 60° C., but preferably below 40° C. to a point where crystallization will occur, i. e., about 80 per cent to 85 per cent solids, exclusive of the mineral acid, and then allowed to crystallize. It is advantageous to stop the concentration operation at about 60 per cent solids and filter at this point before evaporating to the final concentration, since some separation of insoluble degradation products usually has occurred at this stage and the liquor becomes too viscous to permit efficient clarification if evaporation is continued to the final required concentration. After the concentration has been effected the solution is allowed to cool and crystallize The crystalline crop, which consists of about 95 per cent pure glucuronolactone, is removed by filtration or centrifugation, and the mother liquor is either diluted to 40 per cent solids and rehydrolyzed to obtain a second crop or, preferably, recycled and hydrolyzed with the next batch. If the mother liquor is recycled, only enough additional mineral acid need be added to bring the concentration of the total batch to the initial normality. Crystalline crops may be washed with a small amount of methanol, acetone or water to remove adhering mother liquor, washings being added to the mother liquor. If methanol or acetone is used, it should be removed before recycling, for best results. The crystals thus obtained will be substantially pure glucuronolactone but will contain some color. If further purification is desired, this may be accomplished in accordance with the method which will be described subsequently.

The recycling of the mother liquor to the hydrolysis step is an important feature of our invention and permits the recovery of about 75 per cent to 80 per cent of the glucuronic acid component, based on feed to hydrolysis, as crystalline glucuronolactone of good quality. It is surprising that this is possible, since it would be expected that impurities recycled in the mother liquor would become concentrated to a point where crystallization of glucuronolactone would not occur or at least the crystalline product would be of very poor quality. However, one of the unexpected features of our invention is that, when hydrolysis of the oxidation mixture is carried out in the specified manner, non-uronic acid dry substance is destroyed during the reaction under conditions which do not result in any substantial destruction of glucuronic acid. This is possible because, as explained previously, the uronic acid component is present as the relatively stable methyl glucuronoside during a substantial portion of the total reaction period. Some of the non-uronic acid dry substance is lost as volatile compounds and some is removed as insoluble amorphous material when the hydrolyzate is filtered. Additional non-uronic acid dry substance may be lost or destroyed during concentration of the hydrolyzate. The net result is that glucuronic acid purity of the liquor at the time of crystallization is usually greater than that of feed to the hydrolysis operation, and impurities do not build up in the manner that would be expected when the mother liquor is recycled.

However, after 5 to 7 recycles, non-uronic acid impurities build up to a point where further recycling lowers the purity of the hydrolysis feed and as a result the final yield of glucuronolactone is lowered. When the purity of the mother liquor decreases to about 30 per cent glucuronic acid on a dry basis (exclusive of acid catalyst) recovery of at least 30 per cent of the residual glucuronic acid in the mother liquor, as crude glucuronolactone, is accomplished by addition thereto of approximately an equal weight of glacial acetic acid and removing the resulting crystals of glucuronolactone.

Another unexpected feature of our invention is that good yields of a high quality crystalline product are obtainable by concentrating hydrolyzates without removing the mineral acid catalyst. This not only allows a saving in number of processing steps and in amount of catalyst required, but we have found that, in general, better yields and a product of improved quality are obtainable by this procedure than if the mineral acid catalyst is removed. It would be expected that concentration to the necessary solids content in the presence of a constantly increasing concentration of mineral acid might destroy a substantial portion of the glucuronic acid in the mixture. However, as with hydrolysis, it is possible to conduct the evaporation in such a manner, i. e., under vacuum at a temperature within the range of 30° C. to 60° C. but preferably below 40° C., that no appreciable amount of the glucuronic acid is destroyed.

A still further advantage in carrying out the concentration step without removing the mineral acid may possibly lie in the fact that this procedure has a favorable effect on the equilibrium reaction between glucuronic acid and glucuronolactone. Presumably, these two forms are in equilibrium in the hydrolyzate. The latter form is least soluble and tends to crystallize first. At low temperatures and in the absence of mineral acid, that portion of the compound present as lactone may crystallize, but the shift of free acid to lactone may be too slow under these conditions to allow equilibrium to be established as the lactone crystallizes. We have found that the presence of mineral acid does increase the rate of equilibration between glucuronic acid and glucuronolactone. It is probable that if solutions containing mineral acid are evaporated, equilibrium is reestablished quite rapidly as the more insoluble form crystallizes out. At any rate, we have found that crystallization is more rapid and that, in general, a larger portion of the glucuronic acid content of the hydrolyzate can be crystallized as a good grade of lactone if the mineral acid catalyst is not removed. Since pure glucuronolactone is less soluble in aqueous mineral acid than in water alone, the solubility factor may be solely responsible for the improvement.

Referring now to the method for purifying the crude glucuronolactone, we have discovered that when glucuronolactone is dissolved in water, it changes to glucuronic acid very slowly unless the solution is heated strongly or unless mineral acid is present. Therefore, if the crude glucuronolactone is dissolved in water and given a quick treatment with carbon at low temperature, most of the color is removed and very little free glucuronic acid forms. If evaporation is carried out rapidly and at low temperature, crystallization of glucuronolactone uncontaminated with free glucuronic acid can be effected. The mother liquor can be recycled with the next batch of crude to recover the glucuronolactone contained therein. However, eventually the free acid form does build up slowly in the liquor, the rate depending upon the rapidity and temperature at which the operations are performed, so that eventually free glucuronic acid begins to crystallize along with the lactone. The higher the temperature used during the decolorizing and evaporating steps, the sooner crops containing free glucuronic acid will be obtained.

We have discovered that solutions of glucuronolactone that are allowed to equilibrate at low temperatures contain more free glucuronic acid than those equilibrated at high temperatures. Thus, although several weeks is required for equilibrium to be established if glucuronolactone is dissolved in water at 20° C. and held at this temperature, the final equilibrium mixture contains about 80 per cent free glucuronic acid. On the other hand, only about ten minutes is required for equilibrium to be established if the temperature of the solution is raised to about 100° C., and the equilibrium mixture thus obtained contains only about 30 per cent of free glucuronic acid. Therefore, when crystalline crops containing increasing amounts of free acid are obtained in the recrystallization of glucuronolactone, the mother liquor can be heated to establish equilibrium at a more favorable lactone content, then cooled quickly and allowed to crystallize, or it may be recycled with a new batch of crude lactone.

Accordingly, in order to purify the crude glucuronolactone, this is first dissolved as rapidly as possible in water at a temperature within the range of 20° C. to 60° C. but preferably not exceeding about 40° C. to form a saturated solution, then decolorizing carbon is added and intimate contact with the carbon maintained for a relatively short period (preferably not more than about 10 minutes) at a temperature within the above range but preferably not exceeding about 40° C. The carbon is then removed and the solution is evaporated under the highest feasible vacuum at a temperature within the above range but preferably not exceeding about 40° C. to a point just short of that at which the massecuite will solidify (usually 80 per cent to 90 per cent solids content). The crystals are separated and the mother liquor is added to a new solution of crude product, the resulting solution being decolorized and evaporated, as above described, to recover the product remaining therein.

These operations can be repeated a number of times until the amount of free glucuronic acid which slowly builds up in the mother liquor, as described above, is such that it begins to crystallize with the lactone. This usually occurs when concentration of free glucuronic acid in the mother liquor reaches about 40 per cent. At this point the solution is concentrated, preferably under vacuum, to about 80 per cent to 90 per cent solids and heated for about 10 minutes at 90° C. to 110° C. to effect lactonization of the free glucuronic acid. The solution then is cooled to at least 40° C. immediately and quickly. It may be allowed to crystallize or, preferably, it may be recycled with a new batch of crude.

Inasmuch as high temperatures favor lactonization of glucuronic acid and free acid can be converted in large part to lactone by heat treatment (i. e. at 100° C. for 10 minutes), it might appear that the use of high temperatures throughout the recrystallization process might have advantage. However, decomposition of glucuronic acid occurs if solutions are held at high temperatures for any prolonged period of time. Furthermore, although a favorable ratio of lactone to free acid exists in solutions at 100° C., this is not as favorable as that which exists when crude glucuronolactone (which is generally 98 per cent to 100 per cent lactone) is dissolved in water at temperatures below 40° C. The free acid content of a solution prepared in this manner and never allowed to reach a temperature in excess of 40° C. will not approach 30 per cent for a long period of time, whereas if the same crude glucuronolactone is dissolved in water at 100° C. equilibrium at about 30 per cent free acid content will be established within a few minutes. Therefore, distinct advantage is gained by operating at low temperatures at all times except when it becomes necessary to reestablish a more favorable lactone to free acid ratio.

It is desirable to wash the recrystallized glucuronolactone to remove adhering mother liquor and trace impurities. Various solvents, such as water, acetone, or methanol, are suitable but the latter is preferred, since it is a relatively poor solvent for glucuronolactone but dissolves any retained color bodies readily. It also is a better solvent for glucuronic acid than for glucuronolactone and, therefore, small amounts of free glucuronic acid that may be present on the surface of the crystals as a contaminant are removed selectively. Any product dissolved in the methanol is not lost, since the washings can be diluted with water, methanol removed, and their glucuronic acid content recovered separately or by recycling to the next batch.

By way of illustrating our invention, the following specific examples are provided; however, it is to be understood that these examples are illustrative only and are not intended as limiting the invention to these or any other particular examples.

Example I

The following example ilustrates the manner in which the product obtained by oxidizing methyl glucoside is processed to obtain glucuronolactone according to the procedure of our invention, except for the steps involving recycling the mother liquor from primary crystallization to hydrolysis and of recrystallization of the crude glucuronolactone by the preferred recycle process, which are not practical when applied to a single small process sample.

A liquor (5.3 liters) containing by analysis 220 g. of methyl glucuronoside and 545 g. of solids and produced by subjecting a solution containing 589 g. of methyl glucoside to oxidation with oxygen in the presence of a platinum-on-alumina catalyst in accordance with the method which forms the subject of application Serial No. 111,340 was passed over a column containing 4000 ml. of acid regenerated cation exchange resin (such as Nalcite HCR resin, a cation exchange resin distributed by National Aluminate Company) at a rate of 100 ml. per minute. During this operation the pH of the effluent did not rise above 2.2. The cation exchange resin was washed with about three liters of water and the combined effluent and washings then was passed over a column containing 4000 ml. of alkali regenerated resin (such as Ionac A-300 resin, an anion exchange resin manufactured by American Cyanamid) at a rate of 50 ml. per minute and the anion exchange resin was washed with water. The pH of the effluent and washings from the anion exchanger was 10.6 and the solution contained by analysis 247 g. of solids, representing unoxidized methyl glucoside. The anion exchange resin was eluted with ten liters of a 2 per cent solution of sodium hydroxide, fed at a rate of 50 ml. per minute. The resulting eluate was passed over the regenerated cation exchanger regenerated with hydrochloric acid at a rate of 100 ml. per minute to remove sodium and the resin was washed with water. The combined effluent and washings contained by analysis 191 g. of methyl glucuronoside and 272 g. of solids. Thus, the methyl glucuronoside purity (dry basis) of the liquor was increased by the treatment from 40.5 per cent in the original oxidation product to 70 per cent in the liquor which had been subjected to ion exchange treatment.

The solution resulting from ion exchange treatment was concentrated under reduced pressure to 610 ml. and adjusted to 0.5 N with respect to sulfuric acid by addition of 15 g. of 96 per cent sulfuric acid. The acidified liquor was heated in an autoclave at 130° C. for 35 minutes. The autoclave used was not fitted to allow steam stripping, but methanol was prevented from accumulating by intermittent venting. At the end of the 35 minute heating period the batch was immediately blown out. The cooled hydrolyzate was concentrated under high vacuum at a temperature of about 35° C. until the liquor "set up." The crystals were removed with the aid of 100 ml. of glacial acetic acid. (When mother liquors are recycled, evaporation preferably is stopped before the liquor sets up, and acetic acid need not be used. The procedure here described was employed to obtain maximum yield since it was not intended to recycle the mother liquor.) The dried crop of crude glucuronolactone crystals weighed 125 g. and analyzed 96 per cent pure.

Acetic acid was removed from the mother liquor by distillation under vacuum and the residual liquor was diluted to 550 ml. and subjected to hydrolysis at 265° F. for 25 minutes, as described above. The second hydrolyzate was removed, flash cooled, and concentrated to 45 Bé as already described. The resulting crop of crude crystalline glucuronolactone was removed with the aid of 50 ml. of glacial acetic acid; when dried it weighed 11 g. and analyzed 100 per cent pure. Thus, the total yield of crude product, calculated as pure glucuronolactone, amounted to 131 g., representing 42 per cent yield based on methyl glucoside oxidized.

*Example II*

This example illustrates the treatment prior to hydrolysis to remove inorganic impurities and unoxidized methyl glucoside of the mixture obtained by oxidizing methyl glucoside. A solution (30 liters) of methyl α-D-glucoside (176 g.) buffered with sodium carbonate was subjected to oxidation over a column of platinum-on-alumina catalyst according to the method described in co-pending patent application U. S. Serial No. 111,340. Under the conditions employed, 30 per cent of the methyl glucoside was converted to methyl glucuronoside and 52.3 per cent was converted to acidic materials, based on the assumption that each equivalent of titratable acid produced represented the conversion of one mole of methyl glucoside to an acidic compound. On this assumption, 47.7 per cent of the original organic dry substance fed to the column should remain as neutrals, presumably mainly unoxidized methyl glucoside. The aqueous solution from the oxidation reaction was passed over a column of cation exchange resin in the hydrogen state (Duolite C-3 resin manufactured by Chemical Process Company) to remove cations, and then over a column of regenerated anion exchange resin (Duolite A-3 resin, manufactured by Chemical Process Company) to adsorb the acidic components. The neutral effluent from the anion exchanger contained organic dry substance equivalent to 44.7 per cent of the methyl glucoside subjected to oxidation. Removal of this amount of neutral, non-uronic acid dry substance represents increasing the dry basis uronic acid purity of the oxidation liquor from about 30 per cent to about 52 per cent.

*Example III*

During a two-month period of pilot plant operation in which a buffered solution of methyl glucoside was subjected to continuous oxidation over a column of platinum-on-alumina catalyst according to the method described in the co-pending patent application cited above, average uronic acid purity of the demineralized eluate from the oxidation system was 15.6 per cent, dry basis. Average uronic acid purity of demineralized eluate from the anion exchanger during the same period was 55 per cent, dry basis.

*Example IV*

This example demonstrates that extent of hydrolysis of methyl glucuronoside and destruction of glucuronic acid during hydrolysis at fixed temperature, time, and concentration of mineral acid catalyst are independent of dry substance concentration up to about 40 per cent dry substance.

Aliquots of oxidized methyl glucoside solution prepared, as previously described, and free of neutral materials, e. g. unoxidized methyl glucoside, were adjusted to various dry substance concentrations and then made 0.5 N with respect to sulfuric acid. All aliquots then were subjected to hydrolysis at 135° C. for 35 minutes. No provision was made for removing volatile products (methanol) during hydrolysis. The hydrolyzates were cooled and analyzed for glucuronic acid content and dried samples were analyzed for methoxyl content to determine extent of hydrolysis. Data in the following table show that destruction of uronic acid was insignificant up to about 40 per cent solids, but increased thereafter, and that extent of hydrolysis was virtually constant up to about 40 per cent solids but decreased thereafter.

| D. S. (percent) | 10 | 18.3 | 24.6 | 37.5 | 48.9 | 57.6 | 66.6 | 73.7 |
|---|---|---|---|---|---|---|---|---|
| Hydrolysis (percent) | 82 | 82 | 82 | 79 | 74 | 71 | 64 | |
| Destruction (percent) | | | | 2.4 | 6.3 | 12.0 | 13.1 | 21.6 |
| Purity [a] (D. B., after hydrolysis) | 66.5 | 67.5 | 69.0 | 66.0 | 62.5 | 62.5 | 60.5 | |

[a] Initial purity was 63.5 percent glucuronic acid, D. B.

*Example V*

Five batches of demineralized product from the oxidation of methyl glucoside free from unoxidized methyl glucoside which had been concentrated to 40 per cent dry substance were hydrolyzed under pressure—time, temperature and mineral acid normalities used being such as would produce 90 per cent to 95 per cent hydrolysis; steam was introduced continually to strip off methanol. Analyses of the filtered hydrolyzates showed that extent of hydrolysis in the five batches ranged between 91.4 per cent and 94 per cent and that destruction of glucuronic acid during hydrolysis averaged 17.7 per cent.

For comparison, a recycling process was carried out in which demineralized, neutrals-free liquor was hydrolyzed under similar conditions except that the hydrolysis time was that calculated to produce 75 per cent to 80 per cent hydrolysis; steam stripping to remove methanol was employed as before. The hydrolyzate was filtered and concentrated and the crystalline crop was removed. The mother liquor was diluted and added to a fresh batch of the original, demineralized, neutrals-free concentrate. This mixture was then hydrolyzed and processed in the manner described for the first cycle. This process was operated through a total of six cycles. Over-all destruction of uronic acid fed to the system amounted to 8 per cent, as compared to 17.7 per cent in the series where hydrolysis was carried essentially to completion and mother liquor was not recycled. Over-all recovery of crystalline product (glucuronolactone), based on uronic acid fed to the system, was 53 per cent higher from the procedure involving partial hydrolysis and recycling than from that involving essentially complete hydrolysis in a single step. In the recycling procedure, purity increases were obtained consistently over the hydrolysis step in each cycle. It was found that over-all loss of non-uronic acid dry substance amounted to 40 per cent of that fed, as compared to destruction of only 8 per cent of the glucuronic acid. (Non-uronic acid dry substance apparently is lost both as volatiles and as insolubles.) This accounts for the facts that impurities do not build up during the recycle process as would be expected, and that high crystalline yields can be maintained throughout a number of cycles.

Example VI

This example shows the advantage of adding glacial acetic acid to the mother liquor from the last cycle prior to disposal of said mother liquor in order to recover the maximal amount of crude glucuronolactone therefrom. Aliquots of mother liquor from the crystallization of crude glucuronolactone resulting from the seventh cycle of the recycle hydrolysis process were treated with varying amounts of glacial acetic acid. The resulting crystalline crops were removed by filtration, washed, dried and weighed. The resulting yields and purities of the crude glucuronolactone based on glucuronic acid present in the mother liquor are shown in the following table.

| Glacial Acetic Acid, Addition, Percent by Weight | Crystalline Yield, Percent | Purity, Percent |
|---|---|---|
| 0 | 4.2 | 79.5 |
| 32.8 | 21.6 | 94.0 |
| 45.1 | 35.2 | 96.8 |
| 59.7 | 38.7 | 96.8 |

Example VII

Following partial hydrolysis according to the method described in Example V, the maximum possible amount of free glucuronic acid should be recovered by crystallization as glucuronolactone so that a minimum amount is recycled. This example illustrates the fact that such hydrolyzates should be concentrated to about 80 per cent to 85 per cent dry substance to produce a maximum crystalline yield.

A sample of hydrolyzate from a reaction carried out at 40 per cent dry substance, in the manner described previously, to effect about 75 per cent hydrolysis was concentrated at 35° C. and samples were taken at intervals during the concentration operation. Specific gravity readings were obtained on these samples and solids content calculated on a sulfuric-acid-free basis. All samples then were allowed to crystallize and the products were removed and weighed. Resulting data in the following table show that hydrolyzates should be concentrated to about 85 per cent solids to produce maximum crystalline yields.

| | Baumé | Percent d. s. | Percent Recovery [1] |
|---|---|---|---|
| Original | 20.4 | 35.5 | |
| | 28.2 | 50.5 | |
| | 34.6 | 63.6 | |
| | 35.6 | 65.8 | 1.2 |
| | 37.6 | 70.1 | 8.5 |
| | 40.0 | 75.5 | 21.4 |
| | 42.8 | 81.2 | 32.7 |
| | 44.6 | 86.5 | 48.9 |
| Bulk | | | 39.5 |

[1] Based on total uronic acid present in hydrolyzate.

Assuming 75 per cent hydrolysis, 65 per cent of the free glucuronic acid present in the hydrolyzate was recovered as crystalline glucuronolactone from the sample concentrated to 86.9 per cent solids content.

Example VIII

Pure glucuronolactone was dissolved in water and the ratio of free acid to lactone was determined after standing for various times and at various temperatures. Equilibrium apparently had been established in solutions that stood at room temperature for 20 days, and at that time about 80 per cent of the lactone had changed to free acid. Solutions held at 80° C. reached equilibrium in about four hours, about 40 per cent of the total glucuronic acid then being present as free acid. At 100° C., only two hours was required to establish equilibrium and the free acid/lactone ratio was then 0.35.

Example IX

This example illustrates the manner in which a favorable lactone to free acid ratio can be established and the product recovered as high grade lactone when the amount of free acid becomes excessive. A batch of mother liquor (40 per cent D. S.) from the recrystallization of glucuronolactone was found to contain a 50/50 ratio of lactone to free acid. One liter of this liquor was evaporated at low temperature until the massecuite "set up." The vacuum then was broken and the temperature raised to 90° C. until all crystals dissolved. On cooling, removing the resulting crystals and reconcentrating the mother liquor at low temperature, overall recovery as recrystallized glucuronolactone amounted to 92 per cent, and the product contained 2 per cent free acid.

Example X

This example illustrates one procedure for operating the mother liquor recycle recrystallization process to obtain high yields of pure glucuronolactone.

Sufficient water was added to a 4 kg. batch of crude glucuronolactone to effect its solution at 35° C. The solution was agitated with 5 per cent (D. B.) carbon for 30 minutes, after which the mixture was concentrated under high vacuum and a first crystalline crop was removed. The crystals were washed with methanol. The methanol wash was diluted with water and the methanol stripped off under vacuum. To the mother liquor and methanol free wash liquor was added a second 4 kg. of crude glucuronolactone and the mixture was diluted with about 20 liters of water. Five per cent (D. B.) carbon was added and the mixture was held at 35° C. for 30 minutes and processed, as described in the first cycle. Data obtained during 16 cycles of operation in this manner are shown in the following table and illustrate the manner in which free acidity builds up slowly in the mother liquor from cycle to cycle. Over-all recovery of pure glucuronolactone during the 16 cycles amounted to 94 per cent.

| Cycle | Free Acid in Feed (Percent) | Net Yield (Percent) | Cycle | Free Acid in Feed (Percent) | Net Yield (Percent) |
|---|---|---|---|---|---|
| 1 | 3 | 68 | 9 | 24 | 92 |
| 2 | 6 | 75 | 10 | 28 | 93 |
| 3 | 10 | 81 | 11 | 30 | 94 |
| 4 | 14 | 85 | 12 | 31 | 94 |
| 5 | 15 | 90 | 13 | 31 | 94 |
| 6 | 17 | 90 | 14 | 32 | 94 |
| 7 | 23 | 90 | 15 | 34 | 94 |
| 8 | 24 | 91 | 16 | 36 | 94 |

At the end of 16 cycles, the mother liquor was given a heat treatment and the process was continued for 12 more cycles. At the end of this time the yield was 97 per cent.

Example XI

The following example illustrates the preferred procedure for practicing the invention on a large scale. Methyl glucoside was oxidized in accordance with the process described in co-pending application Serial No. 111,340. The resultant mixture containing 10 per cent dry substance of which 12 per cent was methyl glucuronoside, was passed over a cation exchange resin in the hydrogen state (Nalcite HCR sold by National Aluminate Company) and then over an anion exchange resin (De-Acidite sold by The Permutit Company). The anion exchange resin was eluted with 2 per cent sodium hydroxide solution and the eluate passed over a cation exchange resin (Nalcite HCR sold by National Aluminate Company). The resultant demineralized solution containing acidic components of which 60 per cent was methyl glucuronoside was concentrated to 40 per cent dry substance and made 0.5 N with respect to sulfuric acid. The acidified solution was hydrolyzed by heating it at 265° F. for 24 minutes and then cooled rapidly to room temperature. The solution was then concentrated under vacuum (29 inches Hg) to 57 per cent dry substance, filtered and further concentrated under vacuum (29 inches Hg) to 85 per cent dry substance. The concentrated solution was allowed to crystallize and the crystals were then separated and washed with water. The yield of crude crystals was 40 per cent, based on feed to hydrolysis. The mother liquor was returned to the system to be combined with fresh feed solution and resubjected to the hydrolysis treatment. The washed crystals were dissolved in water (40 g./100 cc.) at 35° C. to form a saturated solution. Five per cent of decolorizing carbon was added to the solution and the solution was then agitated for 10 minutes and filtered. The filtered solution was concentrated under vacuum (5 mm. Hg abs.) until the volume had been decreased 50 per cent (80–90 per cent dry substance). The concentrated solution was allowed to crystalline and the crystals were then separated and washed with methanol. The first crop yield of pure glucuronolactone was 68 per cent. The mother liquor was mixed with crude crystals, the mixture dissolved in water, decolorized and treated as above described. After 16 crops of crystals had been obtained, the yield was 94 per cent. At this point the mother liquor was concentrated and heated at 100° C. for 10 minutes before being recycled and the process continued.

*Example XII*

The procedure outlined in Example XI was repeated except that 2 per cent of decolorizing carbon (Darco K-B carbon) was added to each hydrolysis feed solution. The yield of crude crystalline glucuronolactone was increased about 25 per cent. The quality of product was improved and the processing was facilitated mechanically.

We claim:

1. The process of recovering glucuronolactone in crystalline form from aqueous mixtures containing glucuronosides, resulting from the oxidation of glucose derivatives having the aldehyde group protected, which comprises separating the acidic components from the mixture by means of ion exchange resins, whereby an aqueous solution of acidic components including glucuronoside is obtained, concentrating the solution to about 30 per cent but not exceeding about 50 per cent dry substance, adding thereto an acid from the group consisting of sulfuric and hydrochloric acids, the amount of sulfuric acid added being sufficient to adjust the normality of the solution to 0.3 to 2.0 and the amount of hydrochloric acid added being sufficient to adjust the normality of the solution to 0.1 to 0.5, heating the resultant acidified concentrated solution until hydrolysis of the glucuronoside therein is about 60 per cent to about 85 per cent complete, concentrating the hydrolyzate under vacuum at a temperature not exceeding 60° C. to about 80 to about 85 per cent solids content exclusive of the mineral acid, allowing the resultant concentrate of glucuronolactone to crystallize, and separating the crystals from the mother liquor.

2. Process according to claim 1 wherein the mother liquor is recycled with fresh concentrated solution of said acidic components and the combined liquors are subjected to the hydrolysis, concentrating and crystallizing steps, and the recycling process is repeated until the glucuronic acid content of the mother liquor decreases to 30 per cent glucuronic acid on a dry basis, exclusive of acid catalyst.

3. Process according to claim 2 wherein the mother liquor when its glucuronic acid content decreases to 30 per cent is treated separately with glacial acetic acid to obtain glucuronolactone therefrom.

4. Process according to claim 3 wherein the glucose derivative oxidized is methyl glucoside.

5. Process according to claim 3 wherein the glucose derivative oxidized is ethyl glucoside.

6. Process according to claim 1 wherein the mother liquor is combined with fresh concentrated solution of said acidic components and the combined liquors are subjected to the hydrolysis, concentrating and crystallizing steps to obtain further crops of crystalline glucuronolactone.

7. Process according to claim 1 wherein during hydrolysis of the acidified concentrated solution the aglycone component of the original glucose derivative is simultaneously distilled.

8. Process according to claim 1 wherein the glucose derivative is methyl glucoside.

9. The process of recovering glucuronolactone in crystalline form from aqueous mixtures containing glucuronosides, resulting from the oxidation of glucose derivatives having the aldehyde group protected, which comprises separating the acidic components from the mixture by means of ion exchange resins, whereby an equeous solution of acidic components including glucuronoside is obtained, concentrating the solution to about 30 but not exceeding about 50 per cent dry substance, adding thereto an acid from the group consisting of sulfuric and hydrochloric acids, the amount of sulfuric acid being sufficient to adjust the normality of the solution to 0.3 to 2.0 and the amount of hydrochloric acid added being sufficient to adjust the normality of the solution to 0.1 to 0.5, heating the resultant acidified concentrated solution and simultaneously distilling the aglycone component of the original glucose derivative formed during hydrolysis until hydrolysis of the glucuronoside is about 60 per cent to 85 per cent complete, concentrating the hydrolyzate under vacuum at a temperature not exceeding 60° C. to about 85 per cent solids content exclusive of the mineral acid, allowing the resultant concentrate of glucuronolactone to crystallize, and separating the crude crystals from the mother liquor; recycling the mother liquor with fresh concentrated solution of said acidic components and subjecting the combined liquors to the hydrolysis, concentrating and crystallizing steps to obtain further crops of crude crystalline glucuronolactone; dissolving the crude crystalline glucuronolactone in water at a temperature within the range of 20° C. to 60° C. to form a saturated solution, decolorizing the solution with a decolorizing carbon at a temperature within said range, removing the carbon and evaporating the solution under vacuum at a temperature within said range to about 80 per cent to about 90 per cent solids content, separating the resulting crystals of purified glucuronolactone from the residual liquor, recycling the residual liquor by adding it to a new solution of crude crystalline glucuronolactone and subjecting it to the recrystallization treatment aforesaid to obtain further crystals of pure glucuronolactone.

10. Process according to claim 9 wherein the solution concentrated to 80 per cent to 90 per cent solids content is cooled quickly to induce maximum crystallization.

11. Process according to claim 9 wherein the residual liquor is recycled until the concentration of free glucuronic acid therein increases to about 70 per cent, thereafter the said residual liquor is concentrated under vacuum to about 80 per cent to about 90 per cent solids and then heated at 90° C. to 100° C. to effect lactonization of the free glucuronic acid therein and the concentrate is recycled with a fresh solution of crude crystalline glucuronolactone to obtain further crystals of glucuronolactone.

12. Process according to claim 9 wherein the residual liquor is recycled until the concentration of free glucuronic acid therein increases to about 70 per cent, thereafter the said residual liquor is concentrated under vacuum to about 80 per cent to about 90 per cent solids and then heated at 90° C. to 100° C. to effect lactonization of the free glucuronic acid therein and glucuronolactone is recovered from the concentrate.

13. Process according to claim 9 wherein the residual liquor is recycled until the concentration of free glucuronic acid therein increases to about 70 per cent, and thereafter the said residual liquor is concentrated under vacuum to about 80 per cent to about 90 per cent solids content and then heated at 90° C to 100° C. for about 10 minutes to effect lactonization of the free glucuronic acid therein and the concentrate is recycled with a fresh solution of crude crystalline glucuronolactone to obtain further crystals of glucuronolactone.

14. Process according to claim 9 wherein the residual liquor is recycled until the concentration of the free glucuronic acid therein increases to about 70 per cent, and thereafter the said residual liquor is concentrated under vacuum to about 80 per cent to about 90 per cent solids content and then heated at 90° C. to 100° C. to effect lactonization of the free glucuronic acid therein and the concentrate is recycled with a fresh solution of crude crystalline glucuronolactone to obtain further crystals of glucuronolactone and wherein the glucose derivative oxidized is methyl glucoside.

15. Process according to claim 9 wherein the residual liquor is recycled until the concentration of free glucuronic acid therein increases to about 70 per cent, and thereafter the said residual liquor is concentrated under vacuum to about 80 per cent to about 90 per cent solids content and then heated at 90° C. to 100° C. for about 10 minutes to effect lactonization of the free glucuronic acid therein and the concentrate is recycled with a fresh solution of crude crystalline glucuronolactone to obtain further crystals of glucuronolactone, and wherein the glucose derivative oxidized is methyl glucoside.

16. Process according to claim 9 wherein 1 per cent to 5 per cent (dry basis) of decolorizing carbon is added to the acidified concentrated solution prior to the heating treatment.

17. Process according to claim 9 wherein said hydrolyzate is treated with decolorizing carbon.

18. Process according to claim 9 wherein said resulting crystals of purified glucuronolactone are washed with methanol and the methanol wash is diluted with water, the methanol removed therefrom and the methanol free liquor is recycled with said residual liquor.

19. Process according to claim 9 wherein the glucose derivative is methyl glucoside.

20. The process of recovering glucuronolactone in crystalline form from aqueous mixtures containing glucuronosides, resulting from the oxidation of glucose derivatives having the aldehyde group protected, which comprises separating the acidic components from the mixture by means of ion exchange resins, whereby an aqueous solution of acidic components including glucuronoside is obtained, concentrating the solution to about 30 per cent but not exceeding about 50 per cent dry substance, adding thereto an acid from the group consisting of sulfuric acid and hydrochloric acids, the amount of sulfuric acid being sufficient to adjust the normality of the solution to 0.3 to 2.0 and the amount of hydrochloric acid added being sufficient to adjust the normality of the solution to 0.1 to 0.5, heating the resultant acidified solution until hydrolysis of the glucuronoside therein is about 60 per cent to about 85 per cent complete, concentrating the hydrolyzate under vacuum at a temperature not exceeding 60° C. to about 80 to about 85 per cent solids content exclusive of the mineral acid, allowing the resultant concentrate of glucuronolactone to crystallize, and separating the crystals from the mother liquor; subjecting the mother liquor to the hydrolysis, concentrating and crystallizing steps to obtain further crops of crystalline glucuronolactone.

21. The process of recovering pure glucuronolactone from an aqueous mixture resulting from the oxidation of methyl glucoside, which comprises removing any cations with cation exchange resins, adsorbing the acidic components on an anion exchange resin, eluting the resin with a base, treating the eluate with a cation exchange resin to produce a solution containing a mixture of free acids including methyl glucuronoside, concentrating the solution to about 30 per cent but not exceeding about 50 per cent dry substance, adding thereto sufficient sulfuric acid to adjust the normality of the solution to about 0.5, hydrolyzing the resultant acidified concentrated solution for about 24 minutes at a temperature of about 265° F. while simultaneously removing methanol formed during hydrolysis, concentrating the hydrolyzate under vacuum at a temperature not exceeding about 40° C. to about 80 to about 85 per cent solids content, exclusive of the sulfuric acid, allowing the concentrate to crystallize, separating the crude crystals from the mother liquor, and combining the mother liquor with fresh concentrated solution of said mixture of free acids and subjecting the combined liquors to the hydrolysis, concentrating and crystallizing steps to obtain further crops of crude crystalline glucuronolactone; dissolving the crude crystalline glucuronolactone in water at a temperature not exceeding 40° C. to form a saturated solution, decolorizing the solution with decolorizing carbon at a temperature not exceeding 40° C., removing the carbon and evaporating the solution under vacuum at a temperature not exceeding about 40° C. to about 80 per cent to about 90 per cent solids content, separating the crystals of glucuronolactone from the residual liquor, recycling the residual liquor by adding it to a new solution of crude crystalline glucuronolactone and subjecting it to the recrystallization treatment aforesaid to obtain further crystals of glucuronolactone.

22. The process of purifying crude glucuronolactone which comprises dissolving it in water at a temperature within the range of 20° C. to 60° C. to form a saturated solution, decolorizing the solution with decolorizing carbon at a temperature within said range, removing the carbon and evaporating the solution under vacuum at a temperature within said range to about 80 per cent to about 90 per cent solids content, separating the crystals of pure glucuronolactone from the mother liquor, recycling the mother liquor by adding it to a new solution of crude glucuronolactone and subjecting it to the purifying treatment aforesaid to obtain further crystals of pure glucuronolactone, continuing said recycling of mother liquor until the concentration of free glucuronic acid therein increases to about 70 per cent, concentrating the last mentioned mother liquor under vacuum to about 80 per cent to about 90 per cent solids, heating this concentrated liquor at about 90° C. to 100° C. to effect lactonization of the free glucuronic acid, cooling the solution and recovering further crystals of glucuronolactone therefrom.

23. The process of purifying crude glucuronolactone which comprises dissolving it in water at a temperature not exceeding 40° C. to form a saturated solution, decolorizing the solution with decolorizing carbon at a temperature not exceeding 40° C., removing the carbon and evaporating the solution under vacuum at a temperature not exceeding about 40° C. to about 80 per cent to about 90 per cent solids content, separating the crystals of pure glucuronolactone from the mother liquor, recycling the mother liquor by adding it to a new solution of crude glucuronolactone and subjecting it to the purifying treatment aforesaid to obtain further crystals of pure glucuronolactone, continuing said recycling of mother liquor until the concentration of free glucuronic acid therein increases to about 70 per cent, concentrating the last mentioned mother liquor under vacuum to about 80 per cent to about 90 per cent solids, heating the concentrate at about 90° C. to 100° C. to effect lactonization of the free glucuronic acid, cooling the solution rapidly and recovering further crystals of glucuronolactone therefrom.

24. The process of purifying crude glucuronolactone which comprises dissolving it in water at a temperature within the range of 20° C. to 60° C. to form a saturated solution, decolorizing the solution with decolorizing carbon at a temperature within said range, removing the carbon and evaporating the solution under vacuum at a temperature within said range to about 80 per cent to about 90 per cent solids content, separating the crystals of pure glucuronolactone from the mother liquor, recycling the mother liquor by adding it to a new solution of crude glucuronolactone and subjecting it to the purifying treatment aforesaid to obtain further crystals of pure glucuronolactone.

25. In the process of recovering glucuronolactone from aqueous mixtures containing glucuronoside resulting from the oxidation of glucose compounds having the aldehyde group protected, said solution being free of inorganic salts and non-acidic organic compounds, the improvement which comprises adjusting the solids content of the solution to about 30 per cent but not exceeding about 50 per cent, adding thereto an acid from the group consisting of sulfuric acid and hydrochloric acid, the amount of sulfuric acid being sufficient to adjust the normality of the solution to 0.3 to 2.0 and the amount of hydrochloric acid added being sufficient to adjust the normality of the solution to 0.1 to 0.5, heating the resultant acidified solution while simultaneously distilling the aglycone component of the original glucose compound until hydrolysis of the glucuronoside is about 60 per cent to about 85 per cent complete.

26. The process of obtaining glucuronolactone from a solution containing methyl glucuronoside which comprises adjusting the solids content of the solution to about 30 per cent but not exceeding about 50 per cent, adding thereto an amount of sulfuric acid sufficient to adjust the normality of the solution to about 0.3 to 0.7, heating the resultant acidified solution while simultaneously removing methanol formed during hydrolysis until hydrolysis is about 60 per cent to about 85 per cent complete and recovering glucuronolactone.

27. In a process of recovering glucuronolactone in crystalline form from aqueous mixtures containing glucuronosides, resulting from the oxidation of glucose compounds having the aldehyde group protected, the improvement which comprises treating the mixture with ion exchange resins to separate the acidic components, including glucuronoside, from the non-acidic components of the solution.

28. The process of recovering glucuronolactone in crystalline form from aqueous mixtures containing methyl glucuronoside resulting from the oxidation of methyl glucoside, which comprises separating the acidic components from the mixture by treatment with cation exchange resin, then with anion exchange resin, and then with a cation exchange resin, whereby an aqueous solution of acidic components including methyl glucuronoside is obtained, concentrating the solution to about 30 per cent but not exceeding about 50 per cent dry substance, adding thereto an acid from the group consisting of sulfuric and hydrochloric acids, the amount of sulfuric acid added being sufficient to adjust the normality of the solution to 0.3 to 2.0 and the amount of hydrochloric acid added being sufficient to adjust the normality of the solution to 0.1 to 0.5, heating the resultant acidified concentrated solution until hydrolysis of the methyl glucuronoside therein is about 60 per cent to about 85 per cent complete, concentrating the hydrolysate under vacuum at a temperature not exceeding 60° C. to about 80 to about 85 per cent solids content exclusive of the mineral acid, allowing the resultant concentrate of glucuronolactone to crystallize, and separating the crystals from the mother liquor.

DONALD G. BENJAMIN.
SPIRO W. KAPRANOS.

REFERENCES CITED

The following references are of record in the file of this patent:

UNITED STATES PATENTS

| Number | Name | Date |
|---|---|---|
| 2,338,534 | Pasternack | Jan. 4, 1944 |
| 2,520,255 | Peterman | Aug. 29, 1950 |
| 2,520,256 | Peterman | Aug. 29, 1950 |